US011506895B2

(12) United States Patent
Miyao et al.

(10) Patent No.: US 11,506,895 B2
(45) Date of Patent: Nov. 22, 2022

(54) LIGHT-GUIDING DEVICE AND VIRTUAL IMAGE DISPLAY APPARATUS (71) Applicant: SEIKO EPSON CORPORATION, Tokyo (JP)

(72) Inventors: Toshiaki Miyao, Matsumoto (JP); Masayuki Takagi, Azumino (JP); Takashi Takeda, Suwa (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 235 days.

(21) Appl. No.: 16/699,178

(22) Filed: Nov. 29, 2019

(65) Prior Publication Data
US 2020/0174258 A1 Jun. 4, 2020

(30) Foreign Application Priority Data

Nov. 30, 2018 (JP) .............................. JP2018-224623

(51) Int. Cl.
G02B 27/01 (2006.01)
F21V 8/00 (2006.01)
G02B 27/14 (2006.01)

(52) U.S. Cl.
CPC ....... *G02B 27/0172* (2013.01); *G02B 6/0055* (2013.01); *G02B 27/144* (2013.01); *G02B 2027/0178* (2013.01)

(58) Field of Classification Search
CPC .............. G02B 27/0101; G02B 27/017; G02B 2027/0118; G02B 2027/012; G02B 2027/0121; G02B 2027/015; B60R 2300/205; G03B 21/604; G02F 1/133524
See application file for complete search history.

(56) References Cited

U.S. PATENT DOCUMENTS

2007/0188837 A1* 8/2007 Shimizu ................... G02B 5/32
359/13
2014/0139899 A1* 5/2014 Hotta ....................... G02B 5/20
359/227
2015/0185478 A1* 7/2015 Sato ................... G02B 27/0179
345/8
2017/0180685 A1* 6/2017 Takagi ............... G02B 27/0172
2020/0103642 A1* 4/2020 Hirowatari ........... G02B 25/001

FOREIGN PATENT DOCUMENTS

JP 2017-111363 A 6/2017

* cited by examiner

*Primary Examiner* — Mariam Qureshi
(74) *Attorney, Agent, or Firm* — Oliff PLC (57) ABSTRACT A light-guiding device includes a pair of light-guiding portions, a pair of light-incident portions that causes image light to be incident on the respective pair of light-guiding portions, and a pair of light-emitting portion that causes image light guided by the respective pair of light-guiding portions to exit outside, in which a pair of optical members including the pair of light-guiding portions are coupled by a central member having light transmissivity, and in which the central member includes a light-guide blocking structure that suppresses light from being incident from one end to another end of the central member by absorbing the light.

16 Claims, 10 Drawing Sheets

LIGHT-GUIDING DEVICE AND VIRTUAL IMAGE DISPLAY APPARATUS

The present application is based on, and claims priority from JP Application Serial Number 2018-224623, filed Nov. 30, 2018, the disclosure of which is hereby incorporated by reference herein in its entirety.

BACKGROUND

1. Technical Field

The present disclosure relates to a light-guiding device and a virtual image display apparatus that present a virtual image to an observer, and particularly relates to a light-guiding device and the like that enable see-through viewing.

2. Related Art

As a light-guiding device that enables see-through viewing, a device is known which includes a pair of light-guiding members each provided with a light-guiding portion, a light-incident portion, and a light-emitting portion (JP 2017-111363 A). In JP 2017-111363 A, it is described that a light transmission member joined to the pair of light-guiding members is shared between the right and left light-guiding members to achieve see-through viewing, where the light-guiding device is described in which the light transmission member thus shared is centrally disposed in a manner interposed by the pair of light-guiding members, and recesses are provided at the top and bottom of the center portion of the light transmission member.

In the light-guiding device of JP 2017-111363 A, since the vertical center position of the light-guiding member and the vertical center position of the light transmission member are on substantially coincident straight lines, it is likely that projected image light passing through the light-guiding member on one hand propagates through the center of the light transmissive portion, to exit toward the outside from the light-guiding member on the other hand, and to thus cause an image to be observed at an outside in an unintended direction.

SUMMARY

A light-guiding device according to an aspect of the present disclosure is the light-guiding device including a pair of light-guiding portions, a pair of light-incident portions configured to cause image light to be incident on the respective pair of light-guiding portions, and a pair of light-emitting portions configured to emit image light, guided by the respective pair of light-guiding portions, to outside, in which a pair of optical members including the pair of light-guiding portions are coupled by a central member, and in which the central member includes a light-guide blocking structure that suppresses light from being incident from one end to another end of the central member by absorbing, scattering, or diffusing the light.

DESCRIPTION OF EXEMPLARY EMBODIMENTS

First Embodiment

Hereinafter, a virtual image display apparatus according to a first embodiment of the present disclosure will be described below with reference to FIG. 1 and the like.

Figure 1:
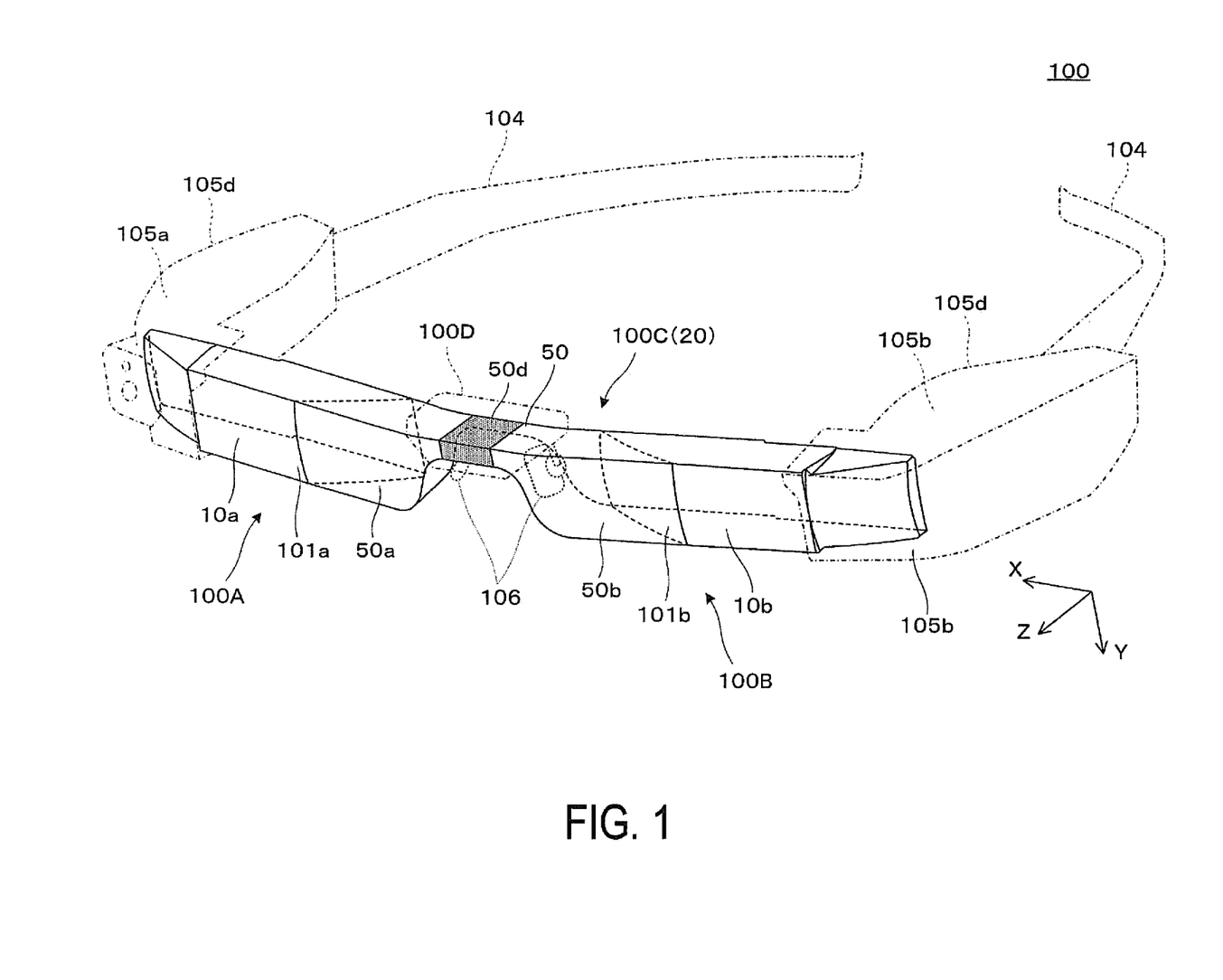
FIG. 1 is an explanatory perspective view illustrating a virtual image display apparatus including a light-guiding device according to a first embodiment.

As illustrated in FIG. 1, a virtual image display apparatus 100 according to the first embodiment, which is a head-mounted display (HMD) having an eyeglass-like appearance, can allow an observer or user wearing the virtual image display apparatus 100 to visually recognize image light or video light due to virtual image, as well as can allow the observer to observe an external image in a see-through manner. The virtual image display apparatus 100 includes a first display device 100A and a second display device 100B. In FIG. 1, X, Y, and Z are an orthogonal coordinate system, where the ±X direction correspond to a lateral direction in which both eyes of an observer wearing the virtual image display apparatus 100 are aligned, the Y direction corresponds to a downward direction orthogonal to the lateral direction in which the both eyes of the observer are aligned, and the Z direction corresponds to a front direction or a front surface direction of the observer.

The first display device 100A and the second display device 100B are parts that form a virtual image for the right eye and a virtual image for the left eye, respectively. The first display device 100A for the right eye includes a first virtual image forming optical portion 101a that covers the front of an eye of the observer in a see-through manner, and a first image forming body 105a that generates image light. The second display device 100B for the left eye includes a second virtual image forming optical portion 101b that covers the front of an eye of the observer in a see-through manner, and a second image forming body 105b that generates image light. The first and second image forming bodies 105a and 105b are each constituted by optical elements (not illustrated) such as a video forming device, a projection lens, and the like, and a member that houses these optical elements, and the like. Note that the optical elements in the first and second image forming bodies 105a and 105b are covered by case members 105d in a cover-like form and supported within the case members 105d. The first and second virtual image forming optical portions 101a and 101b each cause image light generated by the first and second image forming bodies 105a and 105b to be guided and superimposes the external light with the image light to be visually recognized. The first and second virtual image forming optical portions 101a and 101b form a see-through light-guiding unit 100C being a unitary member coupled together at the center rather than separate members. The see-through light-guiding unit 100C, which is a light-guiding device 20 of a composite type that provides visual images for both eyes to an observer by means of guided light, is supported by the case members 105d in a cover-like form at the both ends.

The first and second image forming bodies 105a and 105b are attached with temples 104 being trailing portions extending rearward at the rear portions pivotally by non-illustrated hinges, where the temples 104 function as support portions that are caused to abut against the ears, temple, and the like of an observer to ensure a wearing state. A center cover 100D covering the center portion of the see-through light-guiding unit 100C is fixed between the first and second virtual image forming optical portions 101a and 101b, that is, at the center in the ±X direction of the see-through light-guiding unit 100C. The center cover 100D supports a pair of nose pads 106. The nose pads 106, which constitute the support portions together with the temples 104, are caused to abut against the nose of the observer to enable positioning of the see-through light-guiding unit 100C and the like relative to the eyes of the observer.

Figure 2:
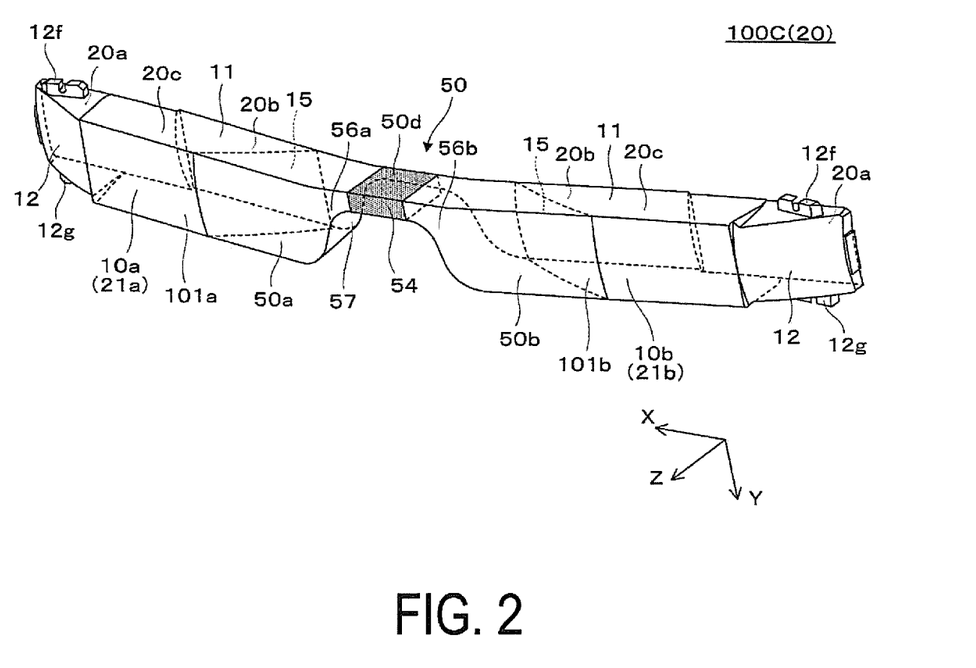
FIG. 2 is an explanatory perspective view illustrating an external appearance of a light-guiding device.
Figure 3:
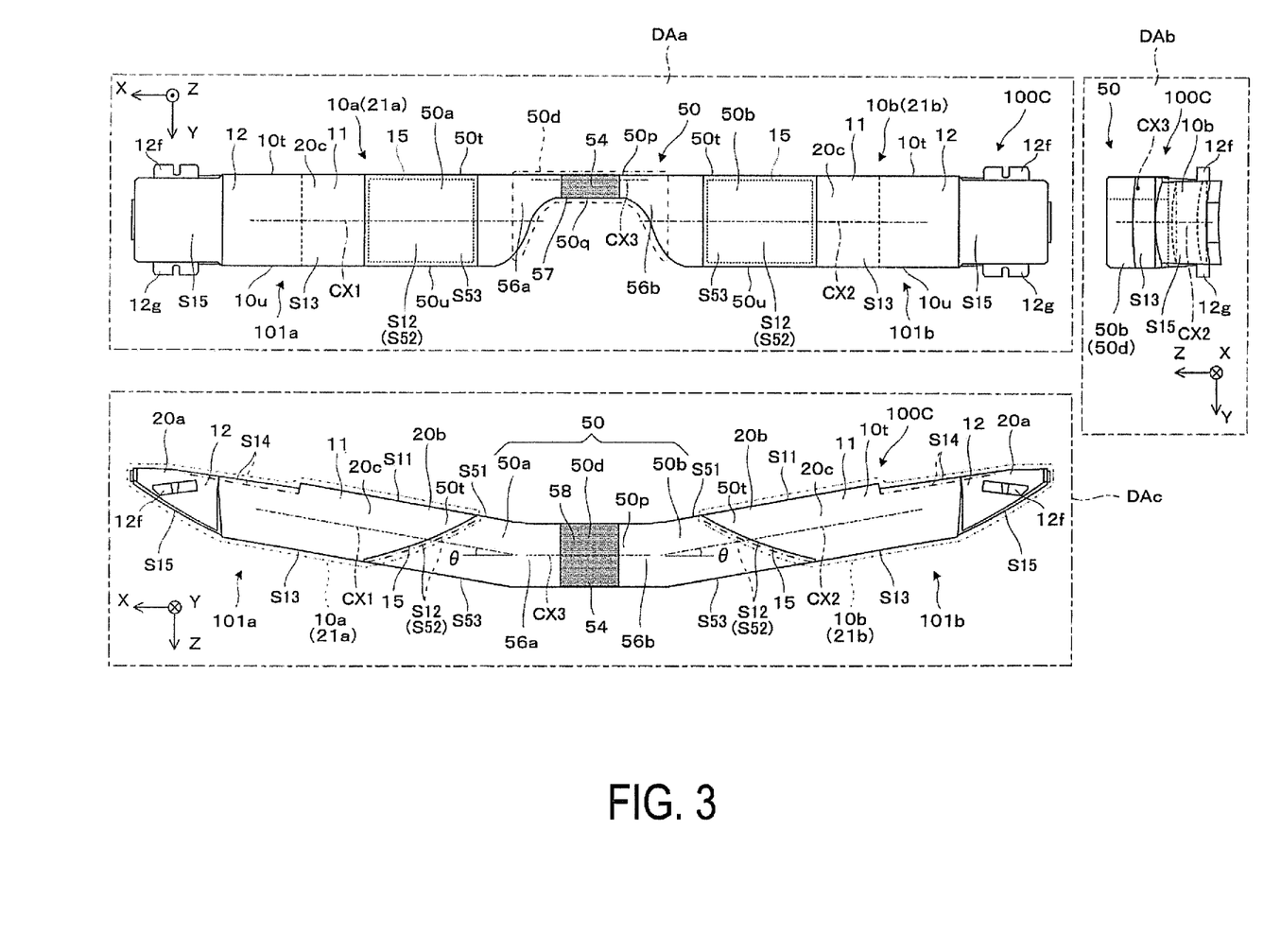
FIG. 3 is a front view, side view, and plan view of a light-guiding device.

A structure of the see-through light-guiding unit 100C, or the light-guiding device 20 will be described below with reference to FIGS. 2 and 3. In FIG. 3, a region DAa illustrates a front view of the see-through light-guiding unit 100C, a region DAb illustrates a side view of the see-through light-guiding unit 100C, and a region DAc illustrates a plan view of the see-through light-guiding unit 100C.

The see-through light-guiding unit 100C includes a pair of light-guiding members 10a and 10b and a central member 50. The pair of light-guiding members 10a and 10b are a pair of optical members 21a and 21b that contribute to virtual image formation along with propagating image light inside therethrough. The pair of light-guiding members 10a and 10b, that are, the pair of optical members 21a and 21b, are fixed to the respective both ends of the central member 50. The see-through light-guiding unit 100C is provided in a straight line-like or rod-like form, as a whole. The see-through light-guiding unit 100C being within a horizontal XZ plane, while protruding forward with slightly bent at the center of the central member 50, has a symmetrical shape. The light-guiding members 10a and 10b have center axes CX1 and CX2 that form an angle θ relative to a center axis CX3 of the central member 50.

The optical member 21a being the light-guiding member 10a on one hand, which is provided with a light-incident portion 20a at the end portion on the +X side and a light-emitting portion 20b at the end portion on the −X side, includes a structure in which a light-guiding portion 20c extends between the light-incident portion 20a and the light-emitting portion 20b, where the light guiding direction as a whole is a direction approximating the −X direction. The light-guiding member 10a on one hand is an integrated member, but can be recognized as separated into a first light guiding part 11 on the light exiting side and a second light guiding part 12 on the light incident side. The first light guiding part 11 of the light-guiding member 10a is provided with a first face S11 being a flat plane facing an eye of the observer, and a second face S12 being a curved plane inclined relative to the first face S11 at the boundary with the central member 50, and is provided with a third face S13 being a flat plane facing the first face S11 and extending parallel thereto. The second light guiding part 12 of the light-guiding member 10a is provided with a fourth face S14 being a curved plane facing the third face S13, and a fifth face S15 being a curved plane inclined relative to the fourth face S14. In the first light guiding part 11, a half mirror 15 is collaterally provided on the surface of the second face S12 facing the central member 50. The half mirror 15 is a reflective film having light transmissivity (that is, a semi-transmission reflective film), which is formed by film forming a metallic reflective film or a dielectric multilayer film, and is appropriately set with a reflectivity with respect to the image light. In the first light-guiding part 11 of the light-guiding member 10a, a lower surface 10u being a lower end of the light-guiding member 10a and an upper surface 10t being an upper end of the light-guiding member 10a are flat planes being horizontal and parallel to each other, which extend along the XZ plane. The lower surface 10u and the upper surface 10t are not required to be exactly parallel to the XZ plane, and may have slight inclination or unevenness within a range that does not interfere with an optical path of image light or the like. The light-guiding member 10b or the optical member 21b on the other hand, which is laterally inverted with respect to the light-guiding member 10a or the optical member 21a on one hand, has a structure and shape as in the light-guiding member 10a or the optical member 21a on one hand. Thus, the redundant descriptions thereof will be omitted, denoting the same portions by the same reference signs as in the light-guiding member 10a or the optical member 21a on one hand.

A pair of fastening portions 12f and 12g provided on the upper surface and the lower surface at the side of the light-incident portions 20a disposed on outer end portions of the optical members 21a and 21b serve as parts for aligning and fixing the image forming bodies 105a and 105b with respect to the light-incident portions 20a.

The central member 50 includes a pair of light transmissive portions 50a and 50b, and a coupling portion 50d. At the light transmissive portion 50a on one hand, a first transmission face S51 being a flat plane facing an eye of the observer is provided, and a third transmission face S53 being a flat plane facing the first transmission face S51 and extending parallel thereto is provided. A second transmission face S52 is disposed between the first transmission face S51 and the third transmission face S53. The first transmission face S51 is on a face extended from the first face S11 of the light-guiding member 10a on one hand, the second transmission face S52 is a curved plane being joined to and integrated with the second face S12 of the light-guiding member 10a on one hand, and the third transmission face S53 is on a face extended from the third face S13 of the light-guiding member 10a on one hand. In other words, the first face S11 and the first transmission face S51 are adjacent to each other, and similarly, the third face S13 and the third transmission face S53 are adjacent to each other, where the respective surfaces are in an aligned state flush with each other to form smooth surfaces. In the light transmissive portion 50a, a lower surface 50u and an upper surface 50t are flat planes being horizontal and parallel to each other, which extend along the XZ plane. The lower surface 50u of the light transmissive portion 50a is disposed parallel to and substantially flush with the lower surface 10u of the light-guiding member 10a. The upper surface 50t of the light transmissive portion 50a is disposed parallel to and flush with the upper surface 10t of the light-guiding member 10a. That is, a part at which the light transmissive portion 50a is coupled to the first light guiding part 11 of the light-guiding member 10a and a periphery of the part have, a rectangular cross-section at each of the positions along the center axis CX1. The lower surface 50u and the upper surface 50t are not required to be exactly parallel to the XZ plane, and may have slight inclination or unevenness within a range that does not interfere with an optical path of external light. The light transmissive portion 50b on the other hand, which is laterally inverted with respect to the light transmissive portion 50a on one hand, includes a structure as in the light transmissive portion 50a on the other hand. Thus, the redundant descriptions thereof will be omitted, denoting the same portions by the same reference signs as in the light transmissive portion 50a on one hand. The coupling portion 50d, which includes a portion bent in a bridge shape, includes a notch 57 recessed upward from the lower surface 50u of the light transmissive portions 50a and 50b. That is, a lower surface 50q or the lower end of the part excluding the both ends in the coupling portion 50d is disposed on the upper side or the −Y side from the lower face 50u of the light transmissive portion 50a and the lower surface 10u of the light-guiding member 10a. A provision of the notch 57 with a depth being not less than a predetermined depth ensures a space for placing the nose. An upper surface 50p or the upper end of the coupling portion 50d is formed flat, coincident with the upper surface 50t of the light transmissive portion 50a and the top surface 10t of the light-guiding member 10a.

Figure 4:
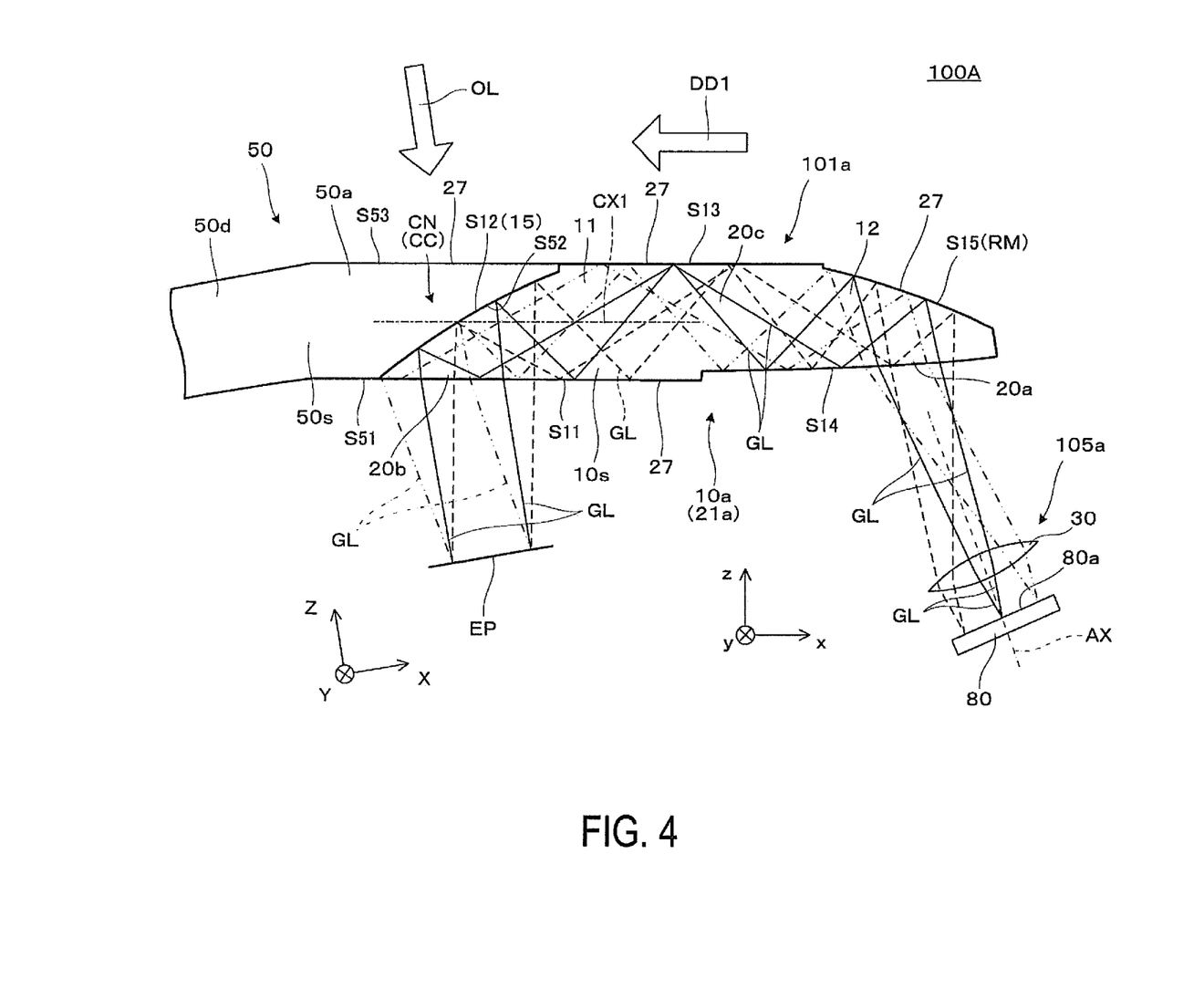
FIG. 4 is an explanatory plan cross-sectional view conceptually illustrating a structure of a display device on one side and an optical path of projected image light.

FIG. 4 is a view partially illustrating the first display device 100A, which specifically extracts a part of the optical system. As already described above, the virtual image display apparatus 100 is constituted by the first display device 100A and the second display device 100B (see FIG. 1), where the first display device 100A and the second display device 100B have right-left symmetrical and mutually equivalent structures, thus the first display device 100A will be exclusively described, and the first display device 100A will be omitted to be described. Note that in FIG. 4, x, y, and z form orthogonal coordinate system, the x and y directions are parallel to the first face S11 and third face S13, and the z direction is perpendicular to the first face S11 and third face S13.

The first display device 100A includes, as the image forming body 105a, an image forming device 80 that generates image light, and a projection lens 30 for imaging.

The image forming device 80 is a self-luminous display element typified by, for example, an organic electro-luminescence (organic EL), an inorganic EL, an LED array, an organic LED, a laser array, a quantum dot emission type element, and the like, and forms a still image or a video image in color on a display region 80a of two-dimensional. The image forming device 80 is driven by a non-illustrated drive control circuit to perform a display operation. When an organic EL display is used as the image forming device 80, the image forming device 80 is configured to include an organic EL control unit. When a quantum dot display is used as the image forming device 80, the image forming device 80 is configured to emit green or red color by causing light of a blue light emitting diode (LED) to pass through a quantum dot film. The image forming device 80 is not limited to a self-luminous display element, and may be constituted by a light modulating element such as an LCD, and may form an image by illuminating the light modulating element with a light source such as a backlight. As the image forming device 80, a liquid crystal on silicon (LCO; LCoS is a trade name), a digital micromirror device, and the like may be used in place of the LCD.

The projection lens 30 protrudes the image light generated by the image forming device 80 toward the light-guiding member 10a of the first virtual image forming optical portion 101a, and causes the image light to be incident on the light-incident portion 20a. The projection lens 30 is a projection optical system including, as components, one or more optical elements or lenses aligned along a direction in which an incident-side optical axis AX extends. The optical elements that constitute the projection lens 30 are held by a non-illustrated lens barrel, which is housed and supported by the case member 105d (see FIG. 1). Note that the optical elements constituting the projection lens 30 can be constituted by aspherical lenses including both an aspherical surface being non-axisymmetric and an aspherical surface being axisymmetric, for example. Then, the optical elements can allow an intermediate image corresponding to a displayed image on the display region 80a to be formed inside the light-guiding member 10a in cooperation with the optical surface or the reflective surface of the light-guiding member 10a.

The light-guiding member 10a in the first virtual image forming optical portion 101a is joined to the light transmissive portion 50a via an adhesive layer CC, where the adhesive layer CC and a joining surface between the light-guiding member 10a and the light transmissive portion 50a interpose the adhesive layer CC are referred to as joining portion CN. The light-guiding member 10a and the light transmissive portion 50a have a structure in which surfaces of body members 10s and 50s are covered with an overcoat layer 27.

The body member 10s in the light-guiding member 10a is composed of a resin material that exhibits high light transmissivity in the visible range, and is molded, for example, by pouring a themoplastic resin into a mold and curing the resin. Note that a cycloolefin polymer or the like can be used as the material of the body member 10s. The light transmissive portions 50a and 50b in the central member 50 are composed of a material that exhibits light transmissivity as in the body member 10s of the light-guiding member 10a, while the coupling portion 50d is composed of a material that partially exhibits light absorption properties. A specific method of fabricating the central member 50 will be described later. The hard coat layer 27 is formed, as an outer layer surface, in such a way that a coating solution is applied to and film formed at the body members 10s and 50s in a state being joined to each other, where the hard coat layer 27 functions as a protective layer that suppresses scratching and the like at surface parts exposed in the light-guiding member 10a and the light transmissive portion 50a. Note that a reflective film RM is formed on the fifth face S15 of the light-guiding member 10a prior to the formation of the hard coat layer 27. An anti-reflective coating film can be formed on the faces S11 and S13 of the light-guiding member 10a and the transmission faces S51 and S53 of the light transmissive portion 50a using, for example, the hard coat layer 27 as the foundation layer.

Hereinafter, the optical path of the image light (referred to as image light GL herein) will be briefly described below. The light-guiding member 10a allows the image light GL to be incident from the projection lens 30 and guides the image light GL toward an eye of the observer by a reflection at the first to fifth faces S11 to S15. Specifically, the image light GL from the projection lens 30 is firstly incident on a part of the fourth face S14 provided at the light-incident portion 20a, to then be reflected at the fifth face S15. Then, the image light GL re-enters the fourth face S14 from inside to be totally reflected, enters the third face S13 to be totally reflected, and is then incident on the first face S11 to be totally reflected. The image light GL totally reflected at the first face S11 is incident on the second face S12 and is partially reflected at the half mirror 15 provided at the second face S12 while partially passing through the half mirror 15, and then re-enters a part of the first face S11 provided at the light-emitting portion 20b to pass therethrough. The image light GL passing through the first face S11 is incident, as a substantially parallel luminous flux, on an exit pupil EP where an eye of the observer is disposed. That is, the observer is to observe an image by image light as a virtual image.

The first virtual image forming optical portion 101a is configured to allow the observer to visually recognize the image light by the light-guiding member 10a, and to allow the observer to observe an external image with little distortion by the light-guiding member 10a in a state combined with the central member 50. Then, the third face S13 and the first face S11 are flat planes that are substantially parallel to each other (the eyepiece visibility is approximately zero), to hardly cause an aberration and the like for the external light OL. Similarly, the third transmission face S53 and the first transmission face S51 are flat planes that are substantially parallel to each other as well. In addition, the third transmission face S53 and the first face S11 are flat planes that are substantially parallel to each other, to hardly cause an aberration and the like. As described above, the observer is to observe a distortion-free external image through the central member 50. Note that a light guiding direction DD1 of the entirety of the luminous flux of the image light GL at the light-guiding member 10a is a direction in which the light-guiding member 10a and the light transmissive portion 50a extend as illustrated in the figure, and the light guiding direction DD1 is typically parallel to the center axis CX1 that will be described below.

A structure of the coupling portion 50d will be described below with reference to FIG. 5A and the like. The coupling portion 50d includes a pair of end portions 50y coupled to the optical members 21a and 21b via the light transmissive portions 50a and 50b, and a bridge portion 50z extending between the pair of end portions 50y. The bridge portion 50z is a portion that is provided with the notch 57. The notch 57 is a portion being recessed in a trapezoidal shape with respect to the lower surface 10u or the lower surface 50u, which is the lower end of the light-guiding member 10a in a front view.

The bridge portion 50z includes a lateral middle portion 50j at the middle in the lateral ±x direction as a portion interposed by the pair of end portions 50y. That is, the lateral middle portion 50j is a part of the coupling portion 50d or the bridge portion 50z.

In the coupling portion 50d, a colored portion 54 composed of a colored resin is provided at the center of the bridge portion 50z at which the notch 57 is provided. The colored portion 54 is provided to traverse the bridge portion 50z, and is provided to traverse the central member 50 in relation to a plane being parallel to the YZ plane. The colored portion 54 includes a light-guide blocking structure 71 provided in a manner embedded within the central member 50, and has light absorption properties for visible light. The colored portion 54 absorbs and attenuates the image light being incident on the colored portion 54. That is, the colored portion 54 as the light-guide blocking structure 71 can reduce and block the image light passing through the central member 50 from one of the optical members 21a and 21b, which is provided on both sides of the colored portion 54, to the other. Specifically, the colored portion 54, when viewed from the optical member 21a on the left side, suppresses incidence of light, by absorbing the light, from the light transmissive portion 50a on one end of the central member 50 and the end portion 50y, to the light transmissive portion 50b on the other end of the central member 50 and the end portion 50y. The colored portion 54, when viewed from the optical member 21b on the right side, suppresses incidence of light, by absorbing the light, from the light transmissive portion 50b on one end of the central member 50 and the end portion 50y to the light transmissive portion 50a on the other end of the central member 50 and the end portion 50y. That is, the colored portion 54 suppresses the light, by absorbing the light, from passing between the first optical member 21a and the second optical member 21b. Here, the colored portion 54 is provided to traverse the coupling portion 50d, to completely block the straight light path between the optical members 21a and 21b. A provision of the colored portion 54 as the light-guide blocking structure 71 at the central member 50 can reduce image light contributing to forming of a ghosting. The light absorptivity of the colored portion 54 is enhanced to increase blocking efficiency of the image light at the coupling portion 50d or the bridge portion 50z. The colored portion 54 is not required to completely block visible light passing through the coupling portion 50d. The colored portion 54 is colored in black opaque in specific examples, but may be one, like ND filter, having semi-transparent properties as long as uniformly absorbing the light in the respective wavelength ranges, or may have biased characteristics that readily transmit light of some wavelengths.

The coupling portion 50d has a shape in which the thickness related to the vertical ±Y direction is reduced at the bridge portion 50z at which the notch 57 is formed, and the bridge portion 50z is relatively shifted to the −Y side being the upper side compared to the light transmissive portions 50a and 50b. That is, in the lateral middle portion 50j being a part of the coupling portion 50d, a center C3 related to the −Y direction being the upper direction orthogonal to the ±X direction (in a narrow sense, ±x direction in FIG. 4) corresponding to the light guiding direction DD1 due to the optical members 21a and 21b is disposed in a state of being shifted upward from centers C1 and C2 related to the −Y direction of the optical members 21a and 21b. Moreover, wall surfaces 50w provided on the sides of the light transmissive portions 50a and 50b of the coupling portion 50d is formed by curved regions AC consisting of a curved surface with an R. The wall surfaces 50w, which consist of a plurality of curved regions AC, are curved as a whole. Image light being incident on these curved regions AC is diffused in response to a diverging action. The curved regions AC diffuse and reduce the image light returning to the second transmission face S52. That is, image light contributing to forming of a ghosting can be reduced.

The shape of the coupling portion 50d or the bridge portion 50z will be described below in a different view point, with reference to FIG. 5B. A coupling portion 950d indicated by a dot-dash line represents a comparative example, which is virtual and standard, having a shape being vertically balanced. In case of the coupling portion 950d of the comparative example, the coupling portion 950d has a shape being vertically balanced, the width related to the vertical direction or the ±Y direction gradually decreases toward both ends, and the width or wall thickness in the vertical direction becomes uniform at the center. In a lateral middle portion 950j of the bridge portion 50z, the center C0 related to the −Y direction as a first direction is disposed at an identical position related to the ±Y direction relative to the centers C1 and C2 related to the −Y direction as the first direction of the optical members 21a and 21b. On the other hand, in case of the coupling portion 50d of the embodiment, the center C3 related to the vertical location of the lateral middle portion 50j is disposed in a state of being shifted by a distance SL toward the −Y direction side being upward from the centers C1 and C2 related to the vertical location of the optical members 21a and 21b and the center C0 related to the vertical location of the lateral middle portion 950j being vertically balanced of the comparative example. A body part 5a in a rod-like form constituting the coupling portion 50d of the embodiment has a shape and arrangement that a body part 5x in a rod-like form constituting the coupling portion 950d of the comparative example is shifted toward the −Y direction side being upward. As described above, the body part 5x is appropriately shifted toward the −Y direction side being upward, to thus form the notch 57 at the lower side.

The notch 57 is, but not limited to, a trapezoidal shape as illustrated in the figure, and may be, for example, a recess such as a triangular, square, or semi-circular shape, in a front view. At the center of the notch 57, the lower surface 50q is not required to be parallel to the XZ surface, and may be a surface being inclined toward the inner side or the −Z side, for example.

A method of fabricating the central member 50 including the coupling portion 50d embedded with the colored portion 54 will be described below. The central member 50 is formed using injection molding method, which is referred to as two-color molding, for example. Specifically, a mold including a mold space corresponding to the colored portion 54 is prepared, and then a thermoplastic resin having light absorption properties is injected into this mold space, to be solidified to form the colored portion 54. Thereafter, metallic mold spaces corresponding to the light transmissive portions 50a and 50b and the like are expanded, then a thermoplastic resin having light transmissivity is injected into this expanded spaces, to thus individually form a portion including the light transmissive portion 50a and a transition portion 56a, and a portion including the light transmissive portion 50b and a transition portion 56b. Then, the transition portions 56a and 56b are fused to the colored portion 54 to be firmly joined to the colored portion 54, to complete the central member 50. The resin material of the colored portion 54 is prepared from a resin material of the same type as that of the light transmissive portions 50a and 50b and a black dye added thereto, under molding conditions having difference in increased glass transition temperature and the like compared to the resin material of the light transmissive portions 50a and 50b. In the above, the colored portion 54 is formed first, however, the portion having the light transmissive portion 50a and the transition portion 56a and the portion having the light transmissive portion 50b and the transition portion 56b may be formed first. Note that an engaging portion having combinations of concavities and convexities may be provided between the colored portion 54 and the transition portions 56a and 56b to enforce the joining of the colored portion 54 to the transition portions 56a and 56b.

The central member 50 may also be formed in such a way that the colored portion 54 is formed by injection molding or the like, and then the portion on one hand including the light transmissive portion 50a and the transition portion 56a that are separately formed, and the portion on the other hand having the light transmissive portion 50b and the transition portion 56b that are separately formed, are affixed to the colored portion 54 using an adhesive or the like.

Figure 5A:
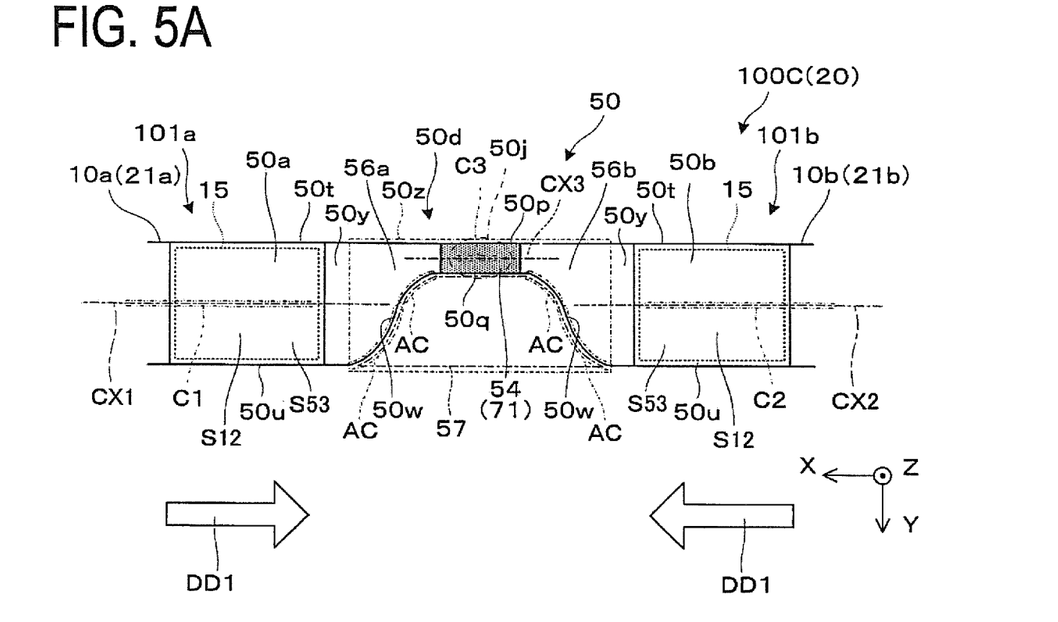
FIG. 5A is an explanatory front view partially illustrating a structure of a central member of a see-through light-guiding unit.
Figure 5B:
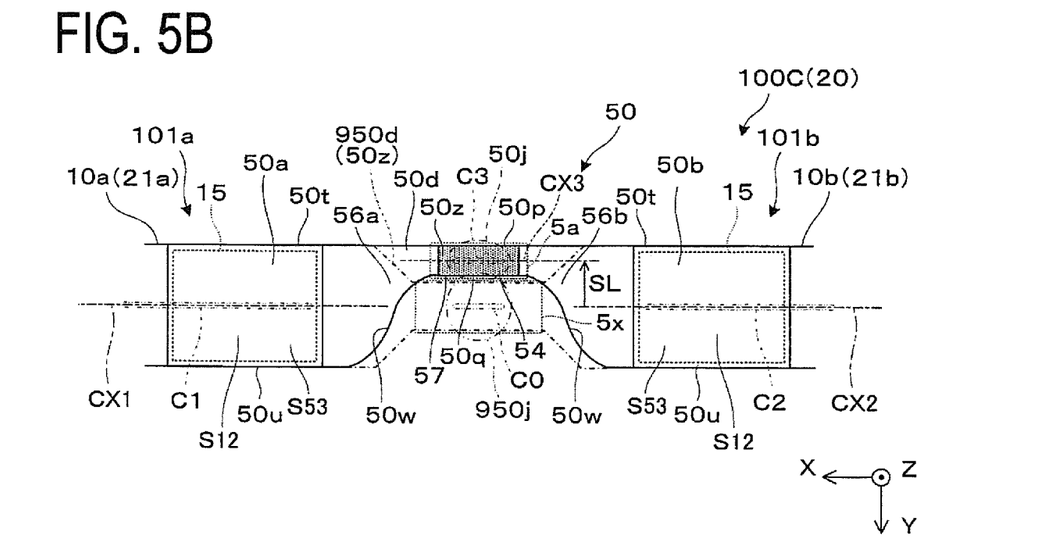
FIG. 5B is an explanatory front view partially illustrating a shape of a central member of a see-through light-guiding unit.
Figure 6:
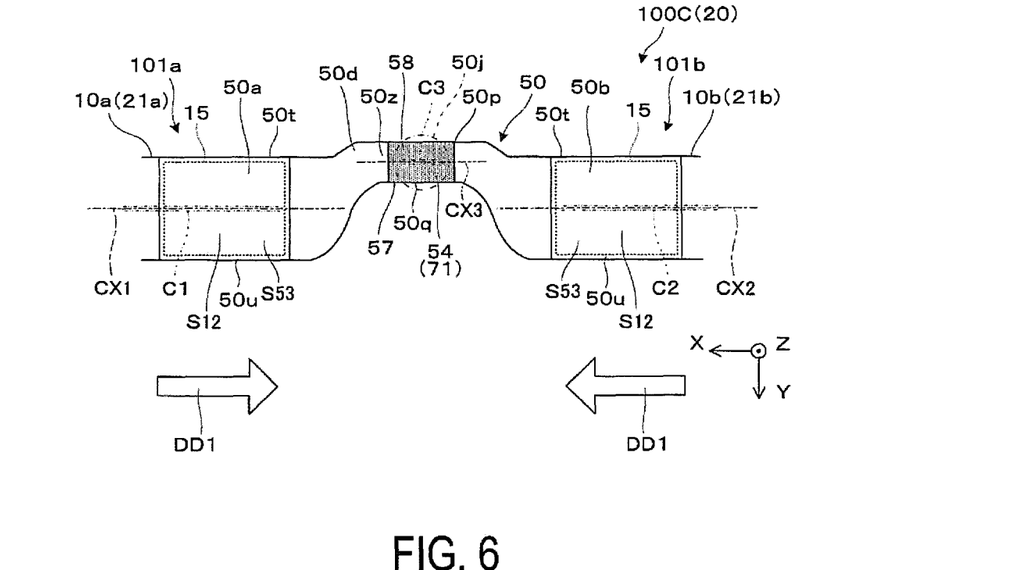
FIG. 6 is an explanatory view illustrating a modification of a shape of a central member illustrated in FIG. 5A.

FIG. 6 is an explanatory view illustrating a modification of a structure of the see-through light-guiding unit 100C or the central member 50 illustrated in FIG. 5A. In this case, the bridge portion 50z of the central member 50 includes a protrusion portion 58 that protrudes upward from the upper surfaces 50t of the light transmissive portions 50a and 50b. In this case as well, the colored portion 54 composed of a colored resin is provided close to the center of the bridge portion 50z. The colored portion 54, which is the light-guide blocking structure 71, causes image light incident from the optical members 21a and 21b to be attenuated, and blocked from passing through due to light absorption properties for absorbing the light within the visible region.

The protrusion portion 58 is provided at the central member 50 as described above and the protrusion amount of the protrusion portion 58 is appropriately set, to thus prevent the coupling portion 50d from becoming thin to lower the strength. Note that in the lateral middle portion 50j being a part of the coupling portion 50d, the center C3 related to the upper direction orthogonal to the ±x direction (see FIG. 4) corresponding to the light guiding direction DD1 due to the optical members 21a and 21b, or the −Y direction, is disposed in a state of being shifted upward (toward the −Y direction) from the centers C1 and C2 related to the −Y direction of the optical members 21a and 21b.

Figure 7:
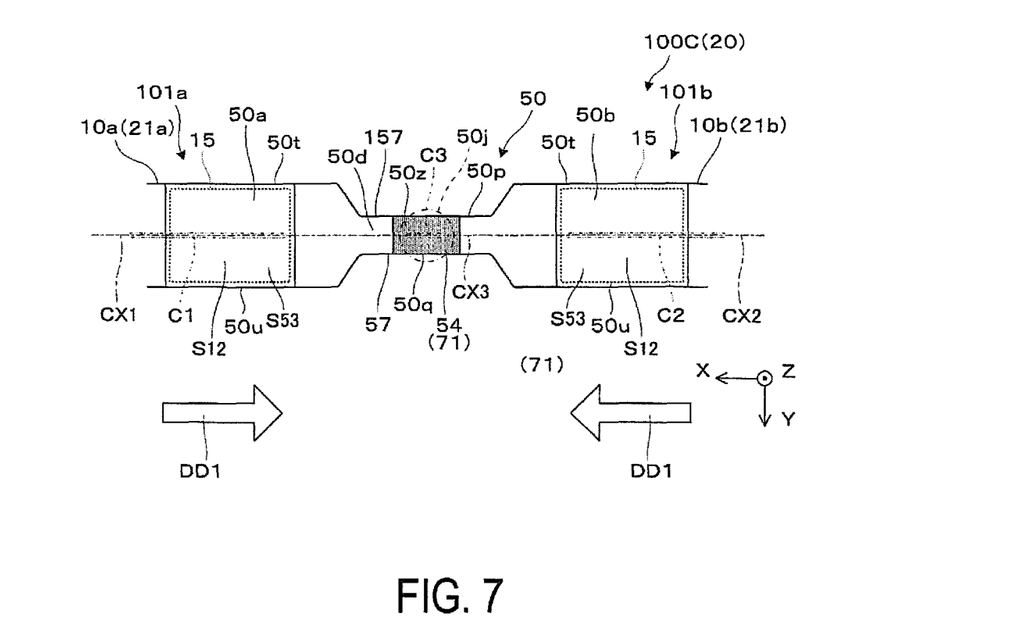
FIG. 7 is an explanatory view illustrating another modification of a shape of a central member illustrated in FIG. 5A.

FIG. 7 is an explanatory view illustrating another modification of a structure of the see-through light-guiding unit 100C or the central member 50 illustrated in FIG. 5A. In this case, the bridge portion 50z of the central member 50 includes the notches 57 and 157 at the upper and lower locations of the bridge portion 50z. In this case as well, the colored portion 54 composed of a colored resin is provided at the center of the bridge portion 50z. The colored portion 54, which is the light-guide blocking structure 71 having light absorption properties for absorbing the light within the visible region, causes image light incident from the optical members 21a and 21b to be attenuated, and blocked from passing through. Note that in the lateral middle portion 50j being a part of the coupling portion 50d, the center C3 related to the upper direction orthogonal to the ±x direction (see FIG. 4) corresponding to the light guiding direction DD1 due to the optical members 21a and 21b, or the −Y direction, coincides with the centers C1 and C2 related to the −Y direction of the optical members 21a and 21b.

Figure 8:
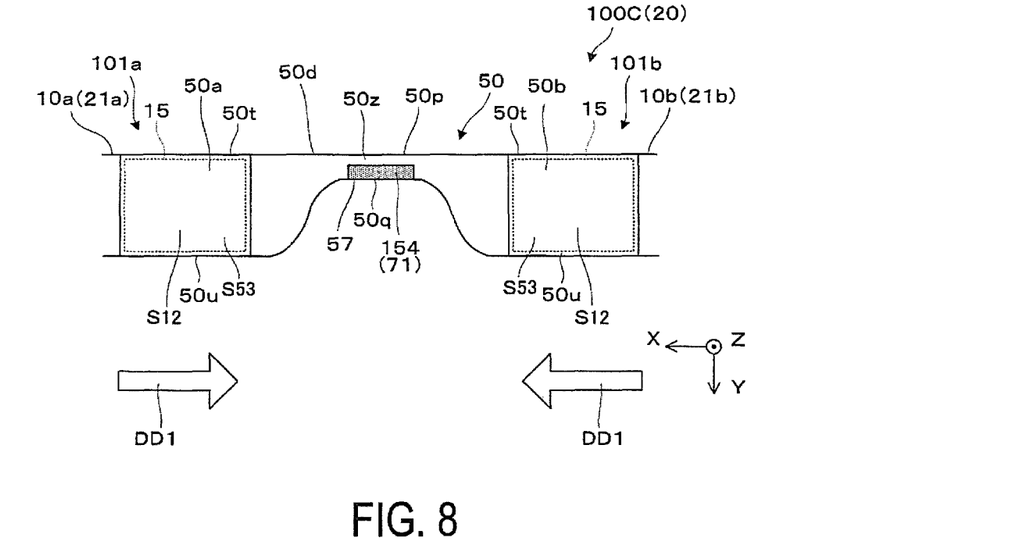
FIG. 8 is an explanatory view illustrating still another modification of a shape of a central member illustrated in FIG. 5A.

FIG. 8 is an explanatory view illustrating another modification of a structure of the see-through light-guiding unit 100C or the central member 50 illustrated in FIG. 5A. In this case, in the bridge portion 50z of the central member 50, a colored portion 154 is provided in a manner partially traversing the bridge portion 50z, and in the illustrated example, the colored portion 154 is formed until a thickness of approximately ⅔ from the lower surface 50q of the coupling portion 50d. The colored portion 154, which is the light-guide blocking structure 71 that is not entirely transverse to the bridge portion 50z, is provided to be embedded in the central member 50. The colored portion 154 can reduce the image light passing through the central member 50 from one of the optical members 21a and 21b to the other, and can reduce the image light contributing to forming of a ghosting. Note that the colored portion 154 can be formed at various parts of the coupling portion 50d in addition to the lower surface 50q side of the coupling portion 50d, for example, at the upper surface 50p side, or at both the lower surface 50q and the upper surface 50p. The length of the colored portion 154 in the lateral direction can be varied without being not limited to a length spanning substantially the whole of the body part 5x. The colored portion 154 can also be divided and provided at a plurality of locations in the lateral direction.

Figure 9:
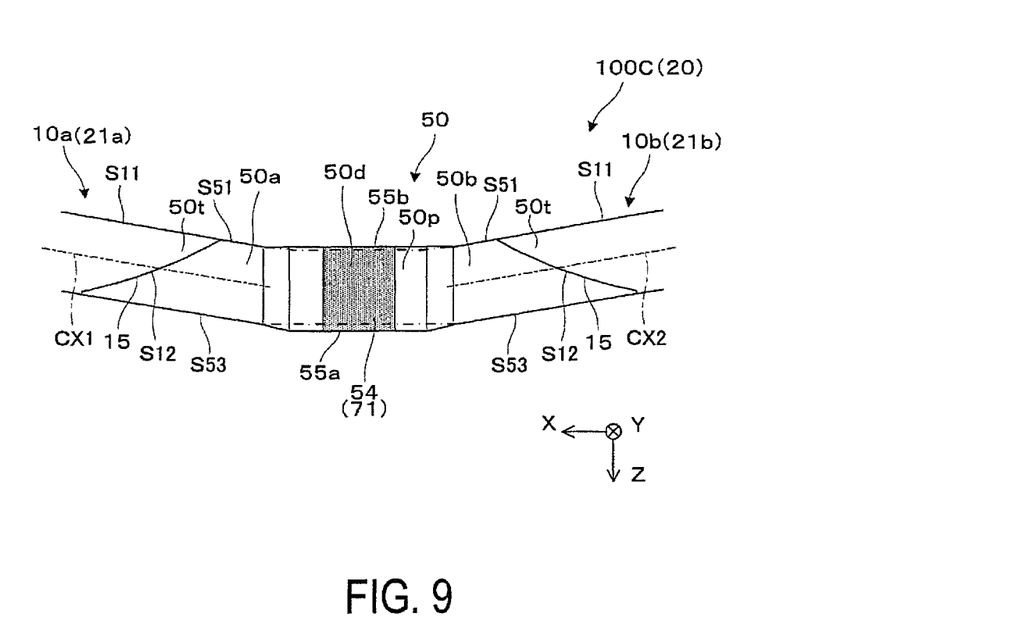
FIG. 9 is an explanatory plan view illustrating still another modification of a shape of a central member illustrated in FIG. 5A.

FIG. 9 is an explanatory view illustrating another modification of a structure of the see-through light-guiding unit 100C or the central member 50 illustrated in FIG. 5A. In this case, the coupling portion 50d of the central member 50 is formed thick in the ±Z direction being a front-and-rear direction, compared to the optical members 21a and 21b and the light transmissive portions 50a and 50b, where a spacing between a front surface 55a and a back surface 55b is widened. In the figure, the dot-dash line indicates the thickness of the central member 50 in the first embodiment. As such, the thickness in the front-and-rear direction or the ±Z direction of the coupling portion 50d is increased to enable enhancing the strength of the coupling portion 50d, and to thus enable reinforcing the central member 50 in terms of bending strength and deflection strength.

In the light-guiding device 20, or the see-through light-guiding unit 100C according to the embodiment described above, the central member 50 includes the light-guide blocking structure 71 that suppresses incidence of light, by absorbing the light, from the light transmissive portion 50b on one end and the end portion 50y to the light transmissive portion 50a on the other end and the end portion 50y, to thus suppress the image light passing through the optical member 21a for light-guiding on one hand from propagating through the central member 50 to exit into the optical member 21b for light-guiding on the other hand, and to thus alleviate the necessity of reducing the thickness of the central member 50 related to the first direction or the −Y direction to facilitate maintaining the strength of the central member 50.

Second Embodiment

Hereinafter, a light-guiding device and a virtual image display apparatus according to the second embodiment will be described below with reference to FIG. 10. Note that the light-guiding device and the virtual image display apparatus according to the second embodiment are partially modified from the light-guiding device and the like according to the first embodiment, and descriptions on the common parts are omitted.

In the light-guiding device 20 illustrated in the figure, a colored layer 454 formed thin is embedded to traverse the middle of the bridge portion 50z at the coupling portion 50d of the central member 50. The colored layer 454 includes the light-guide blocking structure 71 provided to be embedded in the central member 50. The colored layer 454, which is, for example, a light-absorbing film, can absorb and reduce the image light at the time when the image light passes through the coupling portion 50d. That is, the image light passing through the central member 50 from one of the optical members 21a and 21b to the other can be reduced, and thus the image light contributing to forming of a ghosting can be reduced. The colored layer 454 may also be one that blocks image light without being limited to one that reduces image light.

The colored layer 454 can be embedded within the bridge portion 50z using techniques such as film insert molding method being one type of sheet insert molding method. Specifically, a light absorbing film is fixed inside a mold, and a thermoplastic resin having light transmissivity is injected into both of mold spaces partitioned by a light absorbing film to be solidified, to thus complete the central member 50 including the coupling portion 50d.

Figure 10:
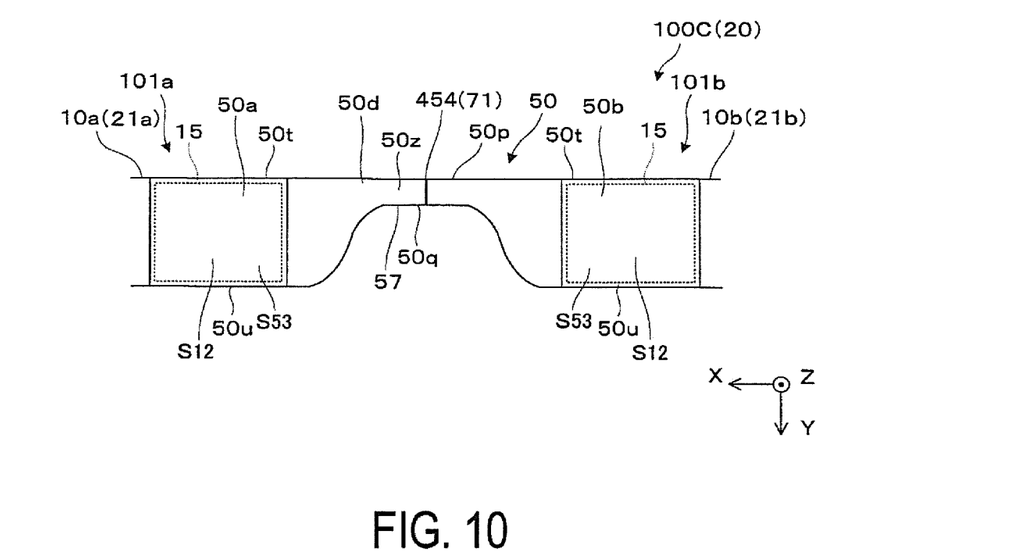
FIG. 10 is an explanatory front view partially illustrating a light-guiding device according to a second embodiment.

The colored layer 454 may be embedded to the central member 50 at which the bridge portion 50z is shifted upward as illustrated in FIG. 10, as well as the central member 50 at which the bridge portion 50z is not vertically shifted as illustrated in FIG. 7.

The colored layer 454 may be one, like ND filter, having semi-transmissivity as long as uniformly absorbing the light in the respective wavelength ranges, or may have biased characteristics that readily transmit light of some wavelengths. The colored layer 454 is not required to entirely traverse the coupling portion 50d. The colored layer 454 may also be embedded at a plurality of locations within the bridge portion 50z.

Third Embodiment

Hereinafter, a light-guiding device and a virtual image display apparatus according to the third embodiment will be described below with reference to FIGS. 11 and 12. Note that the light-guiding device and the virtual image display apparatus according to the third embodiment are partially modified from the light-guiding device and the like according to the first embodiment, and descriptions on the common parts are omitted.

In the light-guiding device 20 illustrated in the figure, a light-absorbing body layer 61 is provided, as the light-guide blocking structure 71, on the front surface 55a, the back surface 55b, and the lower surface 50q of the coupling portion 50d of the central member 50. The light-absorbing body layer 61 is a colored part that is provided to locally cover a surface of the central member 50, and absorbs image light. The light-absorbing body layer 61 is formed by applying and drying a light-absorbing coating material, for example. A provision of the light-absorbing body layer 61 in a manner partially covering the surface of the central member 50 allows the image light to be scattered and dimmed at the time when the image light passes through the coupling portion 50d. That is, the image light passing through the central member 50 from one of the optical members 21a and 21b to the other can be reduced, and thus the image light contributing to forming of a ghosting can be reduced. Specifically, when the coupling portion 50d includes a bridge portion 50z formed into a stepped or neck-like shape, a high functionality of blocking the image light from passing through enables sufficient light-shielding due to the light-absorbing body layer 61 having a small area.

The light-absorbing body layer 61 may also be formed by applying a light-shielding material or affixing a light-shielding film onto the surface of the coupling portion 50d. The light-absorbing body layer 61 integrated with the central member 50 can be fabricated using techniques such as film insert molding method being one type of sheet insert molding method. In addition, the light-absorbing body layer 61 may be one that is embedded within the coupling portion 50d, where a light-absorbing body can be embedded within the coupling portion 50d by, for example, two-color molding.

Figure 11:
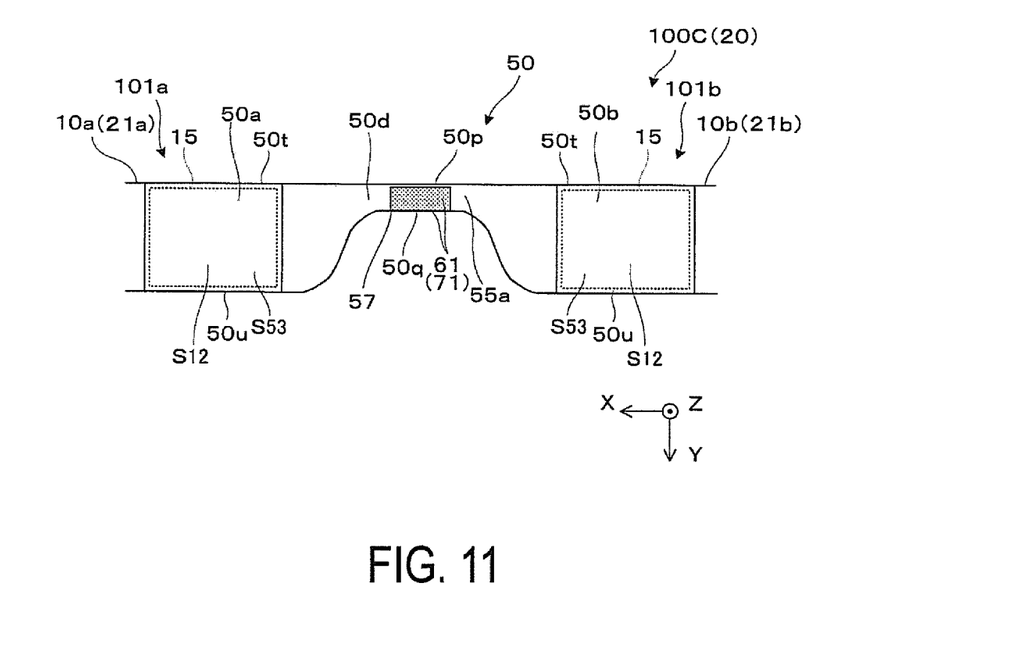
FIG. 11 is an explanatory front view partially illustrating a light-guiding device according to a third embodiment.
Figure 12:
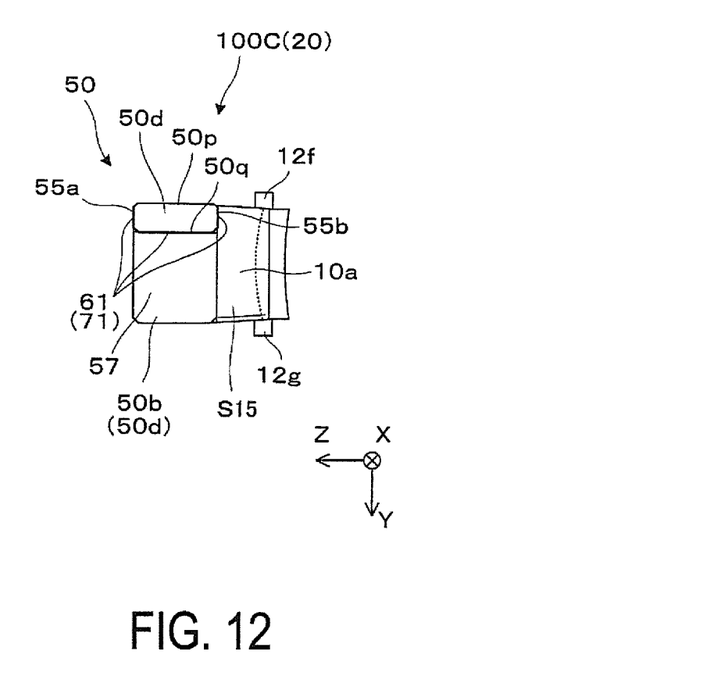
FIG. 12 is an explanatory side-cross sectional view illustrating a light-guiding device according to a third embodiment.

The light-absorbing body layer 61 may be embedded to the central member 50 at which the bridge portion 50z is shifted upward as illustrated in FIG. 11, as well as the central member 50 at which the bridge portion 50z is not vertically shifted as illustrated in FIG. 7.

Fourth Embodiment

Hereinafter, a light-guiding device and a virtual image display apparatus according to the fourth embodiment will be described below with reference to FIG. 13. Note that the light-guiding device and the virtual image display apparatus according to the fourth embodiment are partially modified from the light-guiding device and the like according to the first embodiment, and descriptions on the common parts are omitted.

In the light-guiding device 20 illustrated in the figure, a light scattering layer 62 is formed at the front surface 55a, the lower surface 50q, and the like of the coupling portion 50d of the central member 50. The light scattering layer 62 includes a light-guide blocking structure 71 provided to locally cover a surface of the central member 50. The light scattering layer 62, which is a diffusion surface including a fine concavo-convex structure that scatters image light, can be processed by surface texturing, for example. The surface texturing can be conducted by transferring with a mold when molding is performed. A provision of the light scattering layer 62 in a manner partially covering the surface of the central member 50 allows image light to be scattered at the time when the image light passes through the coupling portion 50d. That is, the image light incident on the light scattering layer 62 irregularly varies in the exiting direction in the micro-area unit, and the light scattering layer 62 can reduce unintentional ghost light. The image light passing through the central member 50 from one of the optical members 21a and 21b to the other can be reduced, and thus the image light contributing to forming of a ghosting can be reduced. Note that the arrangement and size of light scattering layer 62 illustrated in FIG. 13 are given as mere examples, and can be appropriately modified depending on the specifications of the light-guiding device 20. Specifically, when the coupling portion 50d includes a bridge portion 50z formed into a stepped or neck-like shape, a high functionality of blocking the image light from passing through enables sufficient light-shielding due to the light scattering layer 62 having a small area.

Figure 13:
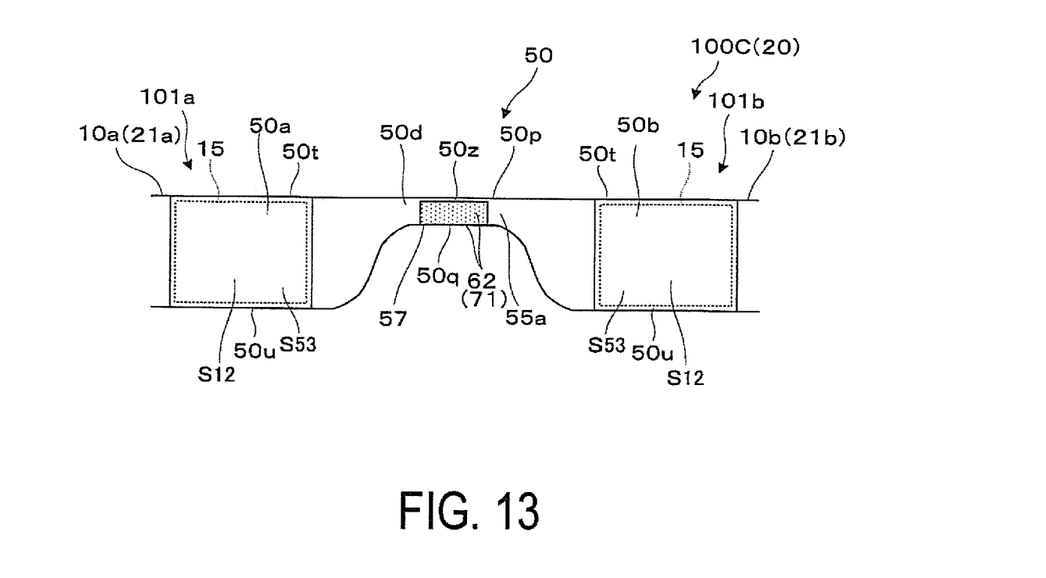
FIG. 13 is an explanatory front view partially illustrating a light-guiding device according to a fourth embodiment.

The light scattering layer 62 may be embedded to the central member 50 at which the bridge portion 50z is shifted upward as illustrated in FIG. 13, as well as the central member 50 at which the bridge portion 50z is not vertically shifted as illustrated in FIG. 7.

The light scattering layer 62 may be embedded within the bridge portion 50z without being limited to one that covers the surface of the bridge portion 50z. The light scattering layer 62 may also be embedded at a plurality of locations within the bridge portion 50z.

Fifth Embodiment

Figure 14:
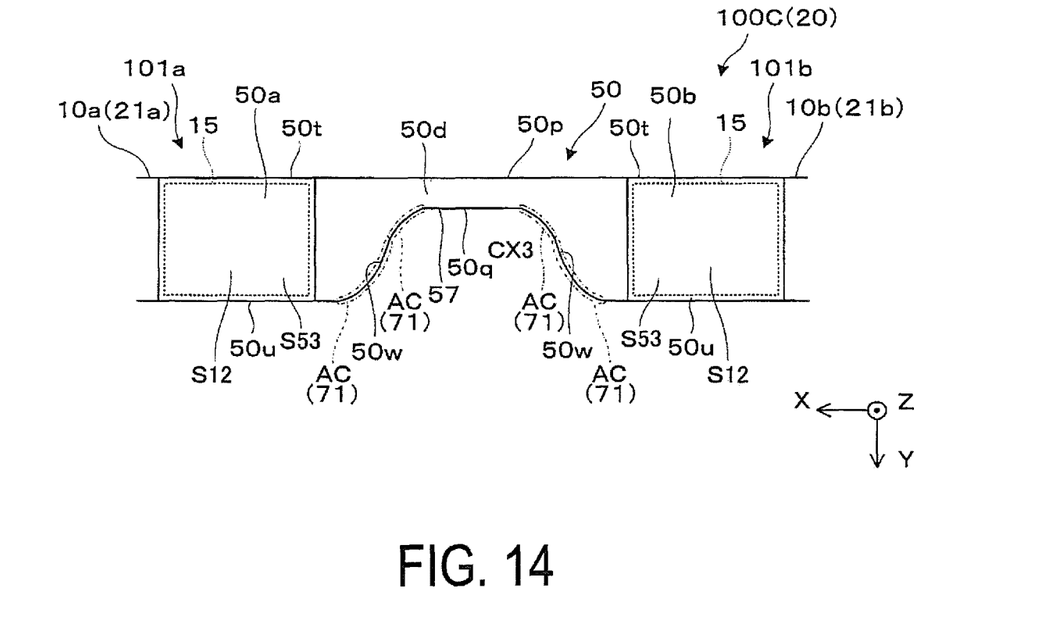
FIG. 14 is an explanatory front view partially illustrating a light-guiding device according to a fifth embodiment.

Hereinafter, a light-guiding device and a virtual image display apparatus according to the fifth embodiment will be described below with reference to FIG. 14. Note that the light-guiding device and the virtual image display apparatus according to the fifth embodiment are partially modified from the light-guiding device and the like according to the first embodiment, and descriptions on the common parts are omitted.

In the light-guiding device 20 illustrated in the figure, the wall surfaces 50w provided on the sides of the light transmissive portions 50a and 50b of the coupling portion 50d of the central member 50 have a function of inhibiting image light from being incident on the coupling portion 50d from the light transmissive portions 50a and 50b. The wall surfaces 50w are formed by curved regions AC consisting of a curved surface provided with an R. The wall surfaces 50w consist of a plurality of curved regions AC having different concavities and convexities, to cause the entirety to be curved. The curved regions AC are the light-guide blocking structure 71 provided to locally cover a surface of the central member 50. When the image light is incident on these curved regions AC, the image light is diffused in response to a diverging action. That is, the image light incident on the wall surfaces 50w undergoes converging or diverging action at the curved regions AC. The image light that once underwent the converging action is finally brought into a divergent state as well. The curved regions AC irregularly diverge the image light to reduce unintentional ghost light, at the time when the image light passes through the coupling portion 50d. That is, the image light passing through the central member 50 from one of the optical members 21a and 21b to the other can be reduced, and thus the image light contributing to forming of a ghosting can be reduced. The curved regions AC can be formed at various locations of the coupling portions 50d in addition to the periphery of the wall surfaces 50w, where in this case, the blocking efficiency of the image light at the coupling portions 50d can be further enhanced. The curved regions AC may also be one being curved in cross section XZ without being limited to one being curved in cross section XY.

The curved regions AC may be formed at a part of the wall surfaces 50w without being limited to the curved regions AC formed at the entirety of the wall surfaces 50w provided at the transition portions 56a and 56b of the coupling portion 50d. The curved regions AC may also be formed at a part of or the entirety of the body part 5a of the coupling portion 50d. The curved regions AC may be either concave face or convex face when viewed from the inside of the coupling portion 50d, as long as not significantly reducing the strength of the coupling portion 50d. The curved regions AC may be embedded in the coupling portion 50d, for example, by forming of a curved boundary face having a refractive index difference inside the coupling portion 50d.

Modifications and Other Particulars

In the first embodiment described above, the colored portion 54 is provided at the center of the bridge portion 50z, however, the colored portion 54 may be provided at, but not limited to, the center, and may also be provided in a variety of shapes without being limited to a quadrangular prism shape.

In the embodiments described above, the coupling portion 50d of the central member 50 is shifted upward from the optical members 21a and 21b, however, the coupling portion 50d may be shifted toward the diagonally upper front side or the −Y+Z direction relative to the optical members 21a and 21b.

The half mirror 15 may also be constituted by a volume hologram or the other hologram element, or may also be constituted by a diffraction grating.

In the virtual image display apparatus 100 in the above-described embodiments, a self-luminous display element such as an organic EL element is used as the image forming device 80. Instead, a configuration in which a laser scanner is configured by combining a laser light source with a scanner, such as a polygon mirror, may also be used as the image forming device 80.

In a specific aspect of the present disclosure, the central member includes a colored portion being colored as a light-guide blocking structure. The image light is absorbed at the colored portion to become no longer contributing to forming of a ghosting.

In still another aspect of the present disclosure, the colored portion is formed by two-color molding. In this case, the colored portion can be formed when molding of the central member.

In still another aspect of the present disclosure, the colored portion is formed by insert molding. In this case, the colored portion can be formed when molding of the central member.

In still another aspect of the present disclosure, the colored portion is provided to traverse the central member. In this case, the image light passes from one end of the central member to the other end is completely blocked.

In still another aspect of the present disclosure, the central member includes a part where a diffusion surface is provided as a light-guide blocking structure. The image light is diffused at the diffusion surface to become no longer contributing to forming of a ghosting.

In still another aspect of the present disclosure, the central member includes a part where a curved surface is provided as a light-guide blocking structure. The image light is diffused while passing through the curved surface to become no longer contributing to forming of a ghosting.

In still another aspect of the present disclosure, the light-guide blocking structure is provided to be embedded in the central member.

In still another aspect of the present disclosure, the light-guide blocking structure is provided to locally cover a surface of the central member.

In still another aspect of the present disclosure, an axis of a part of the central member is disposed in a state of being shifted in a predetermined direction with respect to an axis of a pair of optical members.

In still another aspect of the present disclosure, in a part of the central member, a center, in a vertical direction for an exit pupil, of a part of the central member is disposed in a state of being shifted upward from a center, in the vertical direction, of the pair of optical members. In this case, as a result of the part of the central member being shifted upward, a notch is formed at a lower side of the central member, where the notch serves as a space for inserting the nose to contribute to miniaturization of the light-guiding device.

In still another aspect of the present disclosure, the central member includes, at a lower side, a notch recessed from a pair of optical members.

In still another aspect of the present disclosure, the central member is partially thicker than a pair of optical members in a front-and-rear direction. In this case, the central member can be reinforced in terms of bending strength and deflection strength.

A light-guiding device according to an aspect of the present disclosure is the light-guiding device including a first optical member, a second optical member, and a central member having light transmissivity, in which the first optical member includes a first light-guiding portion, a first light-incident portion configured to cause image light to be incident on the first light-guiding portion, and a first light-emitting portion configured to emit the image light, guided by the first light-guiding portion, to outside, in which the second optical member includes a second light-guiding portion, a second light-incident portion configured to cause image light to be incident on the second light-guiding portion, and a second light-emitting portion configured to emit the image light, guided by the second light-guiding portion, to outside, in which the first optical member and the second optical member are coupled by the central member, and in which the central member includes a light-guide blocking structure that suppresses light from being incident from one end to another end of the central member by absorbing, scattering, or diffusing the light.

A virtual image display apparatus according to an aspect of the present disclosure includes the above-described light-guiding device, and an image forming body configured to form image light that is to be guided to the light-guiding device, and guides image light reflected at a pair of half mirrors provided between a pair of optical members and the central member to an exit pupil.

What is claimed is:

1. A light-guiding device comprising:
a pair of light-guiding portions;
a central member;
a pair of light-incident portions configured to cause image light to be incident on the pair of light-guiding portions respectively; and
a pair of light-emitting portions configured to emit image light, guided by the pair of light-guiding portions, to outside respectively, wherein
a pair of optical members including the pair of light-guiding portions are coupled by the central member,
the central member has a first end and a second end opposed to the first end,
the central member is arranged between the pair of optical members, with the first end attached to one of the pair of optical members and the second end attached to the other of the pair of optical members,
the central member includes a light-guide blocking structure, between the first end and the second end, that suppresses light entering one of the first end and the second end from the other one of the first end and the second end by absorbing, scattering, or diffusing the light,
the light-guide blocking structure is an ND filter having semi-transparent properties,
the ND filter is located between the pair optical members and is not located on an optical path of any of the pair of optical members, and is configured to block straight light path between the pair of optical members, and
the light-guide blocking structure is entirely embedded in the central member.

2. The light-guiding device of claim 1, wherein
the central member includes a colored portion being colored as the light-guide blocking structure.

3. The light-guiding device of claim 2, wherein
the coloring portion is formed by two-color molding.

4. The light-guiding device of claim 2, wherein
the colored portion is formed by insert molding.

5. The light-guiding device of claim 2, wherein
the colored portion is formed to traverse the central member.

6. The light-guiding device of claim 1, wherein
the central member includes a part where a diffusion surface is formed as the light-guide blocking structure.

7. The light-guiding device of claim 1, wherein
the central member includes a part where a curved surface is formed as the light-guide blocking structure.

8. The light-guiding device of claim 1, wherein the light-guide blocking structure is formed to locally cover a surface of the central member.

9. The light-guiding device of claim 1, wherein a plane axis of a part of the central member is disposed in a state of being shifted in a predetermined direction with respect to a plane axis of the pair of optical members.

10. The light-guiding device of claim 9, wherein a center, in a vertical direction for an exit pupil, of a part of the central member is disposed in a state of being shifted upward from a center, in the vertical direction, of the pair of optical members.

11. The light-guiding device of claim 10, wherein the central member includes, at a lower side, a notch recessed from the pair of optical members.

12. The light-guiding device of claim 1, wherein a part of the central member is thicker than the pair of optical members in a front-and-rear direction.

13. A virtual image display apparatus comprising:
a light-guiding device according to claim 1; and
an image forming body configured to form the image light that is to be guided to the light-guiding device, wherein the virtual image display is configured to guide the image light to an exit pupil by reflection by a pair of half mirrors formed between the pair of optical members and the central member.

14. The light-guiding device of claim 1, wherein the first end is attached to the one of the pair of optical members via a first end face of the central member, the second end is attached to the other of the pair of optical members via a second end face of the central member, and the light-guide blocking structure suppresses light transmitting through one of the first face and the second face from the other one of the first face and the second face.

15. A light-guiding device comprising:
a first optical member;
a second optical member; and
a central member having light transmissivity, the central member having a first end and a second end opposed to the first end, the central member being arranged between the first optical member and the second optical member, with the first end attached to the first optical member and the second end attached to the second optical member, wherein
the first optical member includes
a first light-guiding portion, a first light-incident portion configured to cause image light to be incident on the first light-guiding portion, and a first light-emitting portion configured to emit the image light, guided by the first light-guiding portion, to outside, wherein
the second optical member includes a second light-guiding portion, a second light-incident portion configured to cause image light to be incident on the second light-guiding portion, and a second light-emitting portion configured to emit the image light, guided by the second light-guiding portion, to outside, wherein
the first optical member and the second optical member are coupled by the central member,
the central member includes a light-guide blocking structure, between the first end and the second end, that suppresses light entering one of the first end and the second end from the other one of the first end and the second end by absorbing, scattering, or diffusing the light,
the light-guide blocking structure is an ND filter having semi-transparent properties,
the ND filter is located between the first optical member and the second optical member, is not located on an optical path of any of the first optical member and second optical, and is configured to block straight light path between the first optical member and second optical member, and
the light-guide blocking structure is entirely embedded in the central member.

16. The light-guiding device of claim 15, wherein the first end is attached to the first optical member via a first end face of the central member, the second end is attached to the second optical member via a second end face of the central member, and the a light-guide blocking structure suppresses light transmitting through one of the first face and the second face from the other one of the first face and the second face.

* * * * *